April 30, 1957  G. G. LANDIS ET AL  2,790,925
COMBINED ELECTRODE FEED CONDUIT AND DRIVING MEANS THEREFOR
Filed May 12, 1953  2 Sheets-Sheet 2
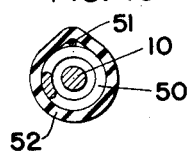
FIG. 10
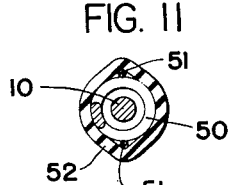
FIG. 11
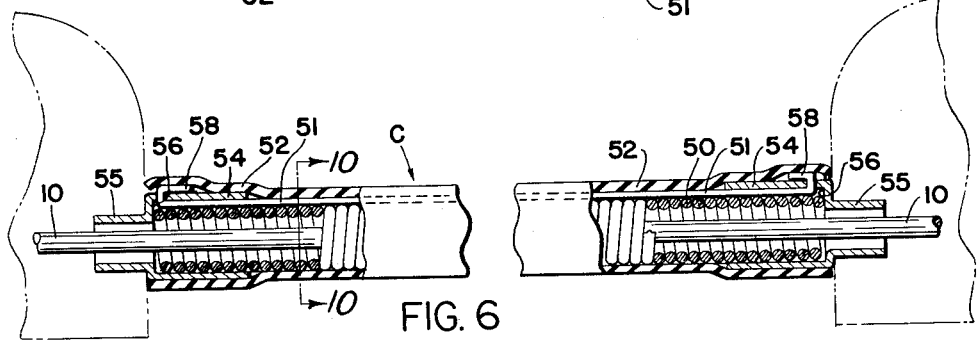
FIG. 6
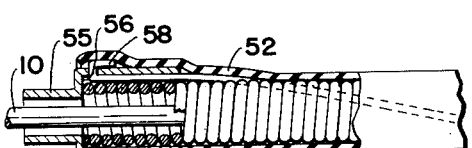
FIG. 7
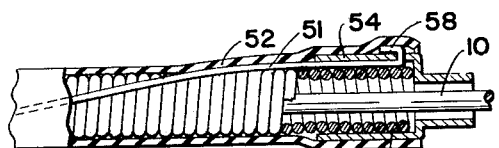
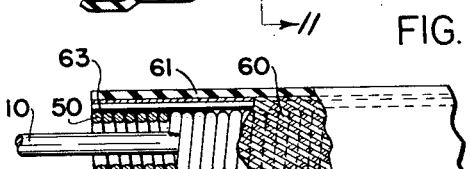
FIG. 8
FIG. 9
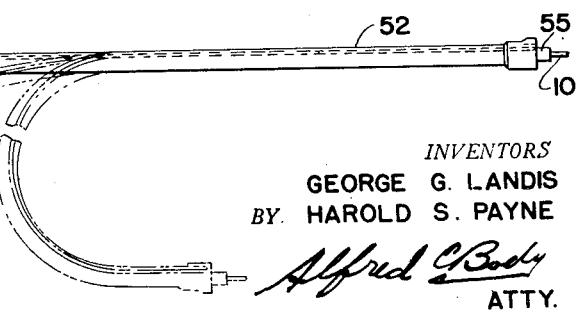
FIG. 12
INVENTORS
GEORGE G. LANDIS
BY HAROLD S. PAYNE
Alfred C Body
ATTY.

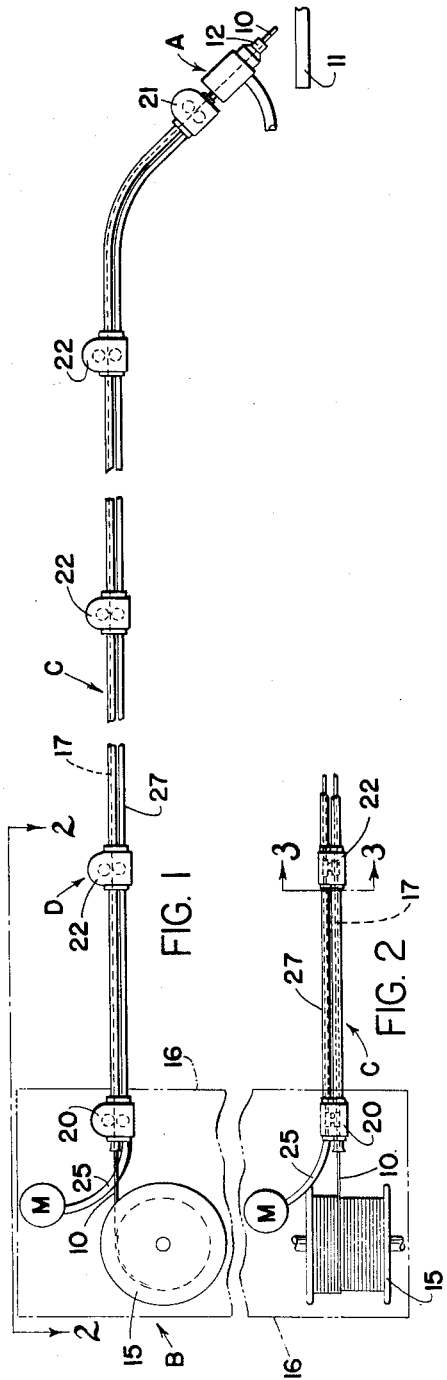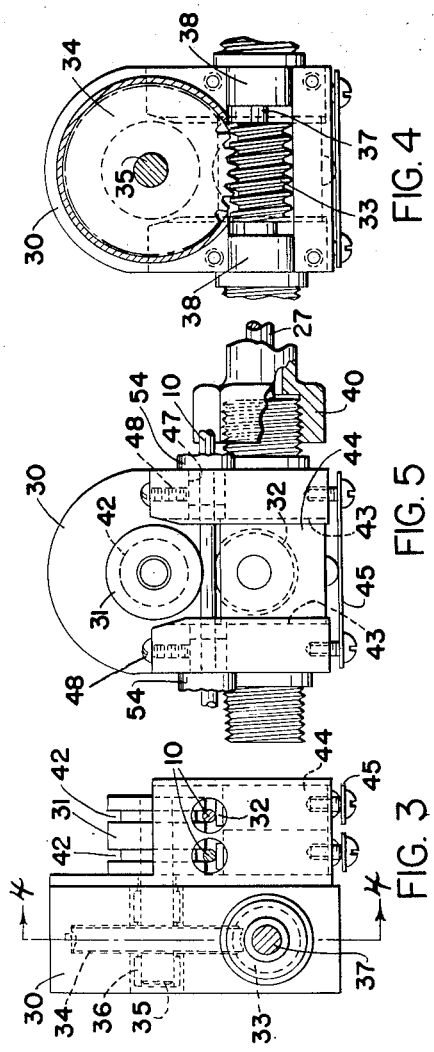

United States Patent Office 2,790,925
Patented Apr. 30, 1957

2,790,925

COMBINED ELECTRODE FEED CONDUIT AND DRIVING MEANS THEREFOR

George G. Landis, South Euclid, and Harold S. Payne, Cleveland Heights, Ohio, assignors to The Lincoln Electric Company, Cleveland, Ohio, a corporation of Ohio Application May 12, 1953, Serial No. 354,576

9 Claims. (Cl. 314—69)

This invention pertains to the art of electric arc welding and, more particularly, to apparatus for continuous arc welding using a continuously fed flexible wire electrode.

The invention is particularly adaptable to apparatus for carrying out the method of U. S. Patent No. 2,444,834 in the name of Landis, et al. and assigned to the assignee of this application, which describes generally the use of a smaller-than-ordinary wire electrode on the order of $3/64$ to $1/16$ of an inch in diameter, together with the imposition of a very high current density on the electrode end, and will be described with particular reference thereto, although it will be appreciated that the invention has broader applications.

In such apparatus, is has been conventional to mount an electrode reel on a relatively fixed base and feed the wire electrode from the reel through a long flexible conduit to a remotely located welding head, including an electrically energized electrode nozzle. Motor-driven rolls mounted on the base adjacent to the reel drive the wire electrode through the conduit and out of the nozzle at a speed corresponding to the burn-off speed of the electrode end.

Certain difficulties are inherent in this type of apparatus which the present invention attempts to overcome or alleviate. The main one of these is the resistance to the free movement of the electrode through the conduit and out of the nozzle. Thus, as the electrode passes through the nozzle, it is ordinarily given a slight twist or bend to insure good electrical contact between the nozzle and the electrode. This resists the movement of the wire and causes it to buckle and bear heavily against the sides of the conduit which increases the frictional forces beyond normal.

In some instances, the forces required to drive the electrode through the conduit and the welding head nozzle increase to a point that the driving rolls for the electrode finally slip, thus marring the surfaces of the electrode which are normally carefully finished to insure satisfactory welding operations or the wire itself will buckle and form a loop at the entrance end of the flexible conduit which is extremely difficult to clear away. Whenever the electrode jams in the conduit for any reason, the arc at the electrode end very quickly burns away the electrode end back into the electrode nozzle.

Normally, where friction exists, lubricants are used, but lubricants on welding electrodes interfere with the making of good welds.

A further and resultant problem with the large forces which must be imposed on the electrode to overcome this friction is the stretching of the flexible conduit under such forces. The conduit must be quite flexible and, heretofore, has been of a special construction; namely, a tightly wound helix of spring steel wire forming a core and an outer braided steel covering which, depending on how tight it is pulled up, limits the stretching or elongation of the core under axial forces.

If this braid is pulled up tight enough to prevent any stretching of the conduit, then the conduit loses some or all of its necessary flexibility. If the braid is not stretched so tight, then the conduit tends to alternately stretch and contract, resulting in a pulsing in the feed rate of the electrode from the nozzle which is most undesirable.

The problem is particularly acute where the welding head must be located at relatively long distances from the electrode because, here, the frictional forces increase to values such as to make it extremely difficult to properly feed the electrode through the long flexible conduit and the total elongation of the conduit under the forces can be considerable.

The present invention contemplates, in electric arc-welding apparatus including a welding head and a remotely located electrode reel, improved means for guiding and feeding an electrode from the reel to the welding head which overcomes all of the above referred to objections and others, is simple in construction, fully flexible, positive in operation and inexpensive to build.

In accordance with the invention, the means for guiding and feeding the electrode from the reel to the welding head comprises at least a pair of electrode drive means, at least one adjacent the reel and one adjacent the welding head for both pushing and pulling the electrode through the conduit. Additional drive means as needed may be positioned intermediate those referred to in the event of very long lengths of feed. The means are all actuated from a common power source, preferably a single motor adjacent the electrode reel, through interconnecting flexible drive cables for synchronizing the rate of feed of the means and a flexible conduit for guiding the electrode from one to the other.

With such an arrangement, the conduits and flexible drive cables may be made in a plurality of relatively short predetermined lengths with quick detachable end couplings complementary to couplings on the drive means such that the welding head may be located at any desired distance from the electrode reel with positive assurance that the electrode will be at all times smoothly fed from the reel to the welding head.

The welding head itself may or may not be provided with such electrode drive means. In the interest of lightness, the drive means in the welding head may be eliminated so long as the last drive means are positioned relatively close to the welding head.

The electrode drive means are all preferably in the form of rolls driven at the same speed through the flexible cables so that there are no longitudinal forces imposed on the flexible conduits. However, progressively greater speeds of electrode drive may be provided as the distance from the electrode reel increases so that, in effect, the electrode is pulled through the flexible conduits, thus exerting a compressive force on the conduit. As the turns of the conduit are in tight abutting relationship anyway, this does not result in any change in length of the conduit. This speed of electrode drive may be controlled by gear changing or by varying the diameter of the electrode drive rolls themselves. In any event, the drive rolls remote from the electrode reel should, in no case, tend to drive the electrode at a speed slower than the electrode drive rolls closer to the electrode reel.

Also, in accordance with the invention, flexible conduits for guiding the electrode from the reel to the welding head are provided comprised of a tightly wound helix of resilient wire having an interior passage sufficient to pass the electrode wire, in combination with one or a pair of diametrically opposed wires extending parallel to or substantially parallel to the axis of the helix and on the outside thereof. Means are provided for holding this wire or wires in firm engagement with the outside of the helix. This wire or wires are pulled up as tight as desired so as to be under tension and so as to hold the individual turns of the helix in firm abutting engagement when the axis of the helix is straight even when a force tending to elongate the helix is applied.

In short lengths, such a conduit, assuming a pair of wires on diametrically opposite sides of the helix are employed, would be quite rigid in the plane of the wires and quite flexible in the plane perpendicular thereto. In fact, this flexibility is much greater than if the conventional braid were used over the wire helix. With one wire, such a conduit would be quite rigid in the plane of the wire and in a direction away therefrom while quite flexible in the other three directions.

The conduits, however, regardless of whether one or a pair of wires are employed, twist quite readily in the plane of the helix when in longer lengths. Thus, any force tending to flex the conduits in the direction of rigidity for the short length results in the conduit twisting in the plane of the helix so that the bend can then take place in the conduit in a relative direction of greatest flexibility. A conduit of great flexibility results and one which may have practically zero elongation under forces tending to stretch the conduit.

The action is much similar to that of the well-known flexible steel tape which is substantially inflexible in short lengths in the plane of the tape but, in longer lengths, is completely and absolutely flexible because the plane of the tape twists to allow the flexing in a direction perpendicular to its plane.

The principal object of the invention is the provision of new and improved electric arc-welding apparatus having simple and positive drive means for a long flexible wire electrode from a reel to a remotely located welding head.

Another object of the invention is the provision of a plurality of drive points spaced between an electrode reel and a welding head whereby to eliminate the possibility of jamming and to assure a smooth feeding of the electrode at all times.

Still another object of the invention is the provision of electrode feed mechanism which may be of any desired length and which may be readily adjusted to different lengths.

Another object of the invention is the provision of feeding means for a flexible wire electrode from a wire reel to a remotely located welding head which includes a plurality of electrode drive rolls driven from a common source and interconnected by flexible means.

Still another object of the invention is the provision of electrode feeding means from an electrode reel to a remotely located welding head which enables the use of a flexible conduit which is simple in construction and economical to manufacture.

Another object is the provision of a conduit construction for feeding electrode to a welding head which has full flexibility and practically zero elongation under elongating forces.

Other objects of the invention will appear upon a reading and understanding of a preferred embodiment of the invention to be described hereinafter.

The invention may be comprised in certain parts and arrangement of parts, a preferred embodiment of which is described in detail in this specification and illustrated in the accompanying drawing which is a part hereof, and wherein:

Figure 1 is a side elevational view somewhat schematic showing electric arc-welding apparatus embodying the present invention;

Figure 2 is a fragmentary view of Figure 1 taken approximately on the line 2—2 thereof;

Figure 3 is a side elevational view of the electrode drive mechanism of Figures 1 and 2, the view being taken approximately on the line 3—3 of Figure 2;

Figure 4 is a cross-sectional view of the drive mechanism of Figure 3, the view being generally on the line 4—4 thereof;

Figure 5 is a side elevational view of Figure 3 with the cover removed;

Figures 6 to 9 are side elevational views partly in section of a flexible conduit constructed in accordance with the present invention;

Figure 10 is a cross-sectional view of Figure 6 taken approximately on the line 10—10 thereof;

Figure 11 is a cross-sectional view of Figure 8 taken approximately on the line 11—11 thereof; and Figure 12 is a side elevational view to somewhat reduced scale of the conduit of Figure 6 showing the flexibility thereof.

Referring now to the drawings wherein the showings are for the purposes of illustration only and not for the purposes of limiting the invention, the arc-welding apparatus shown in Figure 1 includes generally a welding head A, an electrode supply source B remotely located from the welding head A, flexible conduit C for guiding the electrode from the source to the welding head and a plurality of electrode drive means D intermediate the electrode source B and the welding head.

During welding, a wire electrode 10 is continuously advanced from the source B through the conduit C and thence out of the welding head A toward a workpiece 11. An electric arc maintained between the electrode 10 and the workpiece 11 burns or melts off the electrode as fast as it is fed toward the workpiece.

The present invention is not limited to any particular size of electrode, any particular length thereof or any particular material but, preferably, the electrode 10 is of a relatively small diameter such as to be relatively flexible on the order of $\frac{1}{16}$ to $\frac{5}{32}$ of an inch and it is preferably energized as it passes through the welding head A with a voltage such that the current in the portion of the electrode 10 projecting beyond the welding head will have a welding current imposed thereon in excess of 60,000 amperes per square inch. With such a current density, whenever the electrode 10 touches the workpiece, its end will be substantially instantaneously fused and an arc will commence. Furthermore, with such a high-current density, the portion of the electrode sticking out beyond the weld head will be heated in varying degrees determined both by the length of the stickout and the current density by resistance heating to an elevated temperature such that the heat which must be supplied by the arc to melt off the electrode will be lessened and a very high melt-off rate can be obtained. The electrode 10 may be of steel, aluminum, magnesium or any other material which it is desired to deposit upon the workpiece 10. The advantages of using such a high current density in the stickout portion of the electrode and the advantages of using such resistance heating to increase the melt off are more fully described in Patent No. 2,444,834, referred to above and assigned to the assignee of this application. Reference is made to such patent for a fuller description of the welding operation using such high current densities.

The welding head A is relatively conventional and is shown generally schematically. It includes an electrode nozzle 12 which is connected through a heavy flexible insulated current-carrying conductor with a source of welding energy not shown, which source is also connected to the workpiece 11.

The electrode source B in the embodiment shown includes generally a reel 15 mounted for rotation on a base shown schematically at 16 which may be fixed or relatively movable. The electrode wire 10 is coiled about the reel 15 and is advanced from the reel through the flexible conduit C to the welding head.

Each conduit C of which, in the embodiment shown, several are employed in aligned relationship, are generally comprised of a long flexible member having an interior passage 17 of a diameter slightly larger than that of the largest size electrode wire which is to be used with the welding apparatus. Generally, it may be said that this flexible conduit is comprised of a long tightly wound helix of steel wire with the individual turns of the helix in tight abutting relationship, means for preventing the elongation of such helix under longitudinal tension forces and an outer covering of flexible insulating material. The electrode 10 is forceably driven through this conduit and out of the electrode nozzle 12 by means of the electrode drive means D.

A plurality of such electrode drive means D are provided, one indicated generally by the number 20 preferably adjacent to the electrode source B and another indicated generally by the number 21 adjacent to the welding head A. In the embodiment shown, intermediate means indicated by the numeral 22 are also provided. Obviously, more drive means than that shown can be employed or less; but, in accordance with the invention, never less than two.

For the purpose of actuating the drive means D, a motor M shown schematically and preferably positioned on the base 16 connects to the drive means 20 also mounted on the base 16 through a short flexible cable 25. Obviously, the motor M could be connected directly to these drive means 20 or through other forms of mechanical power-transmitting apparatus. The drive means D are all interconnected by flexible drive cables 27 which extend parallel to the individual conduits C and in general close-spaced relationship thereto. The purpose of such a flexible drive cable 27 is to energize each of the electrode drive means D and, at the same time, to synchronize the driving speed thereof so that the driving force on the electrode contributed by each means D may be carefully controlled or proportioned one to the other.

The drive means D shown in the drawings comprises a housing 30, drive rolls 31, follower rolls 32 and a worm 33 and gear drive 34 for driving the drive rolls 31. For this purpose, the drive roll 31 and the gear 34 are mounted on and keyed to a common shaft 35 supported in roller bearings 36 in the housing 30. The worm 33 is mounted for rotation within the housing 30 on a shaft 37 journaled at each end in bushings 38 for rotation about an axis at right angles to the axis of rotation of the shaft 35. Both bushings 38 extend beyond the ends of the housing 30 and are threaded to receive complementary threaded members 40 on the end of each flexible drive cable 27. The specific construction of the flexible cable 27 and the method of connecting same to the drive means D forms no part of the present invention and will not be described further herein.

The drive roll 31 has a groove 42 in the outer periphery thereof having a width slightly less than that of the minimum diameter of the electrode wire 10 which will be used in welding apparatus. This groove is shown as being generally rectangular. Obviously, other shapes of grooves or rolls could be employed. The purpose of the groove 42 is to provide increased power transmitting effect from the roll 31 to the electrode 10.

The follower roll 32 is rotatable on an axis parallel to but spaced from the axis of rotation of the roll 31. This axis of rotation is resiliently movable toward and away from the drive roll 31, this result being obtained by mounting the follower roll 32 in a member 44 slidably mounted in the housing in grooves 43. A spring member 45 resiliently bears against the side of the member 44 remote from the drive roll 31 to resiliently urge the follower roll 32 toward the drive roll 31. The force of this spring tends to wedge the electrode 10 into the grooves 42, resulting in a powerful driving effect on the electrode 10 by the drive roll 31.

The housing 30 has passages 47 aligned with the line of intersection of the rolls 31, 32 and the groove 42. The ends of the flexible conduit C each extend into one of these openings 47 and are held therein by means of setscrews 48. The electrode 10 may thus pass from one conduit C between the drive rolls 31, 32 and thence into the next conduit C to be advanced therealong to the next electrode drive means.

Each electrode drive mechanism is connected with its adjacent electrode drive mechanism by means of a hollow flexible conduit C through which the electrode wire 10 is advanced in its path from the source B to the welding head A. The drive means D are also interconnected by the flexible drive cables 27, each electrode feed means being driven by its respective cable and, in turn, driving the next cable in the sequence from the base 16 to the welding head A.

In operation, it is preferred that the worm 33 and the gear 34 in each drive means D will have the same number of teeth and the same pitch so that the rotative speed of each drive roll 31 will be the same in each means. It is also preferred that each drive roll 31 have the same diameter so that each drive means will tend to drive the electrode at the spaced point at exactly the same speed. With such an arrangement, it will be appreciated that the distance between the drive points of the various feed means along the wire 10 will always tend to remain exactly the same and there will, therefore, neither be compressive forces on the flexible conduit C nor tension forces. In effect, there will be a push-pull action on the electrode during its entire travel from the reel 15 to the welding head A. Preferably, the last electrode drive means 21 will, as stated, be relatively close to the electrode nozzle 12 so that the frictional forces to be built up between this last drive point and the nozzle 12 will be a minimum. Also, as the distance between this drive means and the nozzle 12 is relatively short, the total elongation of the conduit between these two points can be held to a minimum and will not be bothersome.

By pushing and pulling the electrode 10 down the conduit C as taught by this invention, the tendency for the electrode to buckle and bear heavily against the sides of the conduit passage are substantially eliminated and the over-all frictional force of moving the electrode 10 through the conduit are considerable alleviated over feeding means which exert simply a push on the electrode adjacent the reel 15 or a pull adjacent the welding head A. In the event of a pull, it will be appreciated that the electrode 10 will be dragged heavily over the inside of any curves in the conduit C, thus increasing the friction in a manner which the present invention attempts to overcome.

In some instances, in accordance with the present invention, it may be desirable to use the electrode 10 as the tension member to prevent any elongation of the coil forming the core of the flexible conduit C. This can be accomplished by adjusting the driving speed of the various electrode speed means progressively away from the electrode source B to increase in a slight amount. This speed may be readily adjusted by changing the size of the drive roll 31. Preferably, such increase in driving speed between adjacent electrode drive means should not exceed 1 or 2 percent. With such an arrangement, it will be appreciated that the electrode 10 will, at all times, be under tension, thus, in effect, exerting compressive force on the conduit C. The differences in the driving speeds would thus be taken up by a slight slippage between the drive roll 31 and the electrode 10.

Using the present invention, it will be obvious that the electrode source B can be located at any desired distance from the welding head A and the electrode may be fed as easily as though there were little or no spacing. Additionally, the spacing between the two may be readily adjusted by either inserting or removing the electrode drive means together with the intermediate or intervening flexible drive cables and flexible conduit.

It would appear, at first glance, that the use of the two parallel members, the conduit C and the drive cable 27 would, to a large extent, restrict the flexibility of the feed arrangement from the reel 15 to the welding head A, particularly in a plane through the two members. In practice, however, this has proven to be not the case and the flexibility is essentially the same in all directions. This has been found to result from the fact that whenever a force is placed on the welding head or elsewhere tending to flex the two cables in the plane therethrough, the cables simply twist or reorient themselves through an angle of 90 degrees to the direction of the bend so that the bend then occurs in the plane perpendicular to the plane through the two members. Extreme flexibility results.

Using the present invention and, thus, eliminating the forces tending to elongate the conduit C, it will be appreciated that the construction of the conduit C can be considerably simplified over that previously employed which, as heretofore stated, consisted of a flexible steel braid placed over the inner core and which was then pulled tight to a degree such as to limit the elongation while decreasing the resiliency of the conduit to a minimum.

The present invention contemplates, however, a conduit construction which will have, for all practical purposes, zero elongation under any forces exerted by the electrode which would tend to elongate such conduit but which still permits the conduit to have full flexibility.

Figures 6 and 7 show a preferred embodiment of such conduit. The conduit shown consists essentially of an inner flexible core 50, tension means 51 for preventing elongation of the core and outer means 52 for holding the tension means 51 in close surface engagement with the outside of the core 50.

The inner core 50 is in effect, comprised of a plurality of rigid circular-like members, in side-by-side, abutting relationship, free to move apart, and in effect to pivot relative to each other, and in the preferred embodiment is comprised of a long helix of spring steel wire so wound that the sides of adjacent turns will be in abutting engagement. The interior diameter of the core may be as desired, but sufficient to receive and freely pass the largest size wire electrode 10 which will be used with the conduit. The ends of this core extend into a ferrule or fitting 54 having a portion 55 of reduced diameter forming a shoulder 56 against which the ends of the core 50 may bear. The tension means 51 in the embodiment shown in Figure 6 is comprised of a single strand of resilient wire positioned externally of the core 50 and extending parallel to the axis thereof. This wire, at its ends, extends into the inside of the larger portion of the ferrule 54 and passes outwardly through an opening and is bent back on itself as shown at 58 so as to be permanently associated with the ferrule 54 and the core 50. Obviously, soldering, brazing or welding could be employed to securely fix the ends of the core 50 and the ends of the wire 58 with the ferrule 54. Also, the ferrule 54 could be entirely eliminated and other means for rigidly fixing the ends of the wire 53 with the ends of the core 50 may be employed.

The means 52 for holding the tension means in firm engagement with the outside of the core 50 in the preferred embodiment comprises a long tube of resilient insulating material extending the full length of the conduit from one ferrule 54 to the other. This covering 52 serves a number of functions, one being to prevent the entrance of any flux into the interior of the core 50, another being to provide electrical insulation for the conduit C and a third being to hold the tension means 51 in firm assembled relationship with the sides of the core 50. For this last purpose, the material should preferably be under peripheral tension when in position.

It is to be noted that, in Figure 6, only a single wire is employed to the tension means 51 and this wire, during the course of assembly of the conduit C, is pulled up as tight as possible; that is, it is pulled up so that the individual turns of the core 50 are in firm abutting relationship and any tension forces on the end of the conduit are transmitted from one end to the other through the means 51 rather than through the core 50. As the wire 51, for all practical purposes, has zero elongation under such forces, it will be appreciated that the conduit itself will be restrained from elongating.

It will be appreciated that placing the wire 51 under tension is a relatively simple matter. There is no binding of the wire as it is placed under tension as would be the case if a braid of wires around the core were to be pulled up tight by a tension force on one end of the braid.

The wire 51 is shown as being of a single strand, although it will be appreciated that the wire could be made up of a plurality of fine filaments, either all extending in close-spaced parallel relationship or braided amongst themselves. In no event should such fine filaments be braided around the core 50, however.

The cable shown in Figure 6 has a maximum degree flexibility. The core 50 is made of relatively small-diameter wire and has a flexibility in and of itself which is a maximum. The outer covering 52 does tend to limit the flexibility somewhat, depending upon the resilience of the covering. This restraint in the flexibility is the same in all directions and can be made to be a minimum amount. Neglecting the outer covering 52, it will be appreciated that the conduit of Figure 6 has nothing to restrain its flexibility when bent in a direction toward the wire 51 and a very slight degree of restraint in the plane perpendicular to the axial plane of the wire 51. As will appear, even this slight restriction on the flexibility is only apparent in short lengths of the conduit. In the fourth direction; namely, away from the wire 51, it would appear that the tension on the wire 51, holding the turns of the helix in abutting relationship, would result in a very limited or no flexibility at all. This is true in very short lengths of the conduit. However, the present invention is only concerned with longer lengths of the conduit. Here, any force tending to bend or flex the conduit in a direction away from the wire 51; that is, in the fourth direction, simply results in the cable twisting about its own axis to bring the wire 51 to the side or to the inside of the bend. The flexing thus actually occurs in one of the previously mentioned three directions of full flexibility. This action is clearly shown in Figure 12. The flexible covering 52 holds the wire 51 in firm engagement with the outside of the helix during this twisting action.

All of the above is in direct contradistinction to the usual construction of flexible conduits wherein a braid of small wires is placed around the helix. Here, when tension is placed on the braid to pull it up tight, the wires are drawn in one on top of the other toward the axis of the helix. A self-locking action occurs, preventing the braid from being pulled up as tight as desired. Thus, the problem of elongation of the conduit under the forces of pushing the electrode wire through the conduit occurs. If the braid could be pulled up tightly enough to prevent this elongation, then the effect is a conduit which is effectively a solid or continuous tube. Such a member has very little flexibility.

Figure 7 shows a slight alternative embodiment of the invention shown in Figure 6. In Figure 7, the wire 51, instead of extending parallel to the axis of the helix 50, is wound around the core 50 uniformly from one ferrule to the other but with an extremely long pitch, such pitch preferably being one turn in not less than three feet.

With such a long pitch, the conduit can twist about its own axis when a bending force is placed on the conduit such as to bend the conduit in a plane away from the wire 51.

Figure 8 shows a still further modification of the invention wherein a pair of tension means 51 each in the form of a wire extend from one end of the conduit to the other, these wires being at diametrically opposite points on the core 50. By the use of two such wires 51, it will be appreciated that the conduit in short lengths will have a maximum degree of flexibility in the plane perpendicular to the plane through the wires 51 and substantially zero flexibility in the plane through the wires. However, in longer lengths, with which the present invention is intended to be used, the same action as described with reference to the embodiment of Figure 6 and shown in Figure 12 will occur and when a bending force is placed on the conduit in the plane through the wires 51, the conduit will twist about its axis so that the flexing actually occurs in the plane perpendicular to the plane through the wires. A maximum degree of flexibility exists.

Figure 12 attempts to show schematically how the conduit of Figure 6 is able to flex so readily even though the wire 51 is pulled up tight to hold the turns of the helix in firm abutting relationship. It will be noted that for slight bends, the conduit need only twist about its axis a limited amount; but, where 180 degree bends in the conduit must be made, then a substantial amount of twisting of the conduit results so that the conduit can have a maximum degree of flexibility. In other words, the flexing takes place in a plane other than that through the wires.

It is to be noted that the tension means 51 is in immediate physical engagement with the sides of the core 50. The purpose of such a construction is to eliminate any play or relative movement of the wire 51 relative to the core 50 during the various flexing operations which would occur if a resilient insulating material were provided to separate the two members. Furthermore, there is no danger of the wire 51 wearing holes in the insulated safety covering.

Figure 9 shows a still further modification of the invention which, in some instances, has been found to be most desirable in practice. In this embodiment, the core 50 is formed as above described; namely, of a long helix of tightly wound wires preferably of spring steel. Tension means in the form of a single wire 51 extend in engagement with the outer surface of the core over the entire length thereof. This wire 51 is pulled up as tight as possible and with both of its ends rigidly and permanently fixed to the respective end of the core 50. In this embodiment, the means for holding the wire 51 in engagement with the sides of the core 50, instead of being the resilient insulating material shown in Figure 8, is a long hollow tube of braided steel wire 60 having its end rigidly and permanently fixed to the ends of the core 50 along with the ends of the wire 51. Over the outside of this steel braided tube is a tube 61 of imperforate resilient electrically insulating material which may or may not fit tightly about the inner members as is desired. This covering 61 performs only the function of electrical insulation and the exclusion of dirt from the inside of the conduit and may, in some instances, be eliminated if desired.

The wire 51 serves the function of transmitting from one end of the conduit to the other any axial forces imposed on the conduit such as by the frictional forces required to push the electrode through the conduit. Thus, this wire should, if a conduit of zero elongation is desired, be pulled up as tightly as possible. It will be appreciated, however, that if a certain predetermined degree of elongation of the conduit is desired, this degree of elongation can readily be introduced by allowing the appropriate amount of slack in the wire 51.

The flexible braided tube 60 is also preferably pulled up relatively tight but not so tight as to restrict the flexibility of the conduit. The prime purpose of the braided tube 60 is to take the wearing action of the helix 50 and the wire 51, at all times holding the wire 51 in close abutting engagement with the sides of the helix. Additionally, the braided tube 60 serves the function of preventing too sharp bends at any place along the helical core 50 which could possibly occur using the embodiment of Figure 6. Thus, the braided covering 60 tends to require the flexing of the conduit to be spread out over its entire length rather than permitting it to occur at any one localized spot, in which event it would be possible that the end of the electrode, in being initially pushed into the conduit, could pass between the turns of the helix at the sharp end and pierce the outer flexible covering.

In this embodiment of the invention, it will be noted that no ferrule or other fitting is provided on the ends of the conduit but, instead, the end turns of the core 50, the ends of the wire 51 and the ends of the braided cover 60 are all brazed into a single integral unit, as at 63.

The conduit shown in the various figures but, particularly, that in Figure 9 is relatively easily assembled. By one preferred method, the helical core 50 is slipped over the end of a long rod and stops at each end of the rod in abutment with the ends of the core 50 and are pulled up tight to insure that the turns of the helix will be in firm abutting relationship. The wire 51 is then layed along the conduit and one end is brazed or otherwise fixed to its respective end of the core 50. Then the flexible tube 60 is slipped over the above assembly and its end is permanently fixed to the end of the conduit along with the fixed end of the wire 51. Then the wire 51 is pulled up as tight as desired, usually as tight as possible and its free end secured adjacent the end of the helix 50. Then the tube 60 is pulled tight along the length of this above assembly. It will be appreciated, however, that almost no amount of pulling on this conduit 60 can pull it up so tight as to prevent any elongation of the assembled conduit. Thus it might be said that this braided steel covering may be pulled up as tight as possible. The free ends of thte tube 60 and the wire 51 are then brazed or otherwise fixed to the end of the helix 50. The insulated covering 61 may then be assembled with this above assembly and the conduit is ready for use.

It will be noted that in all instances the core 50 has been shown as made up of round steel wire, it having been found that such a construction has a minimum frictional resistance to the passage of the electrode through the conduit. Obviously, other shapes of wire could be employed.

In operation, a sufficient number of conduits C to provide the desired spacing of the base unit 16 from the welding head A are selected and are assembled in end-to-end relationship with the electrode drive means D interposed between each conduit. The reduced end 55 of each ferrule is inserted in the opening 47 of the drive means D, thus automatically aligning the passage of the conduit with the driving surface of the driving roll 31. In a like manner, the flexible drive cables, which are preferably of the same length as the conduit C, are assembled with the electrode drive means D so that the driving action of the motor M will be transmitted from one means D to the next all the way to the last housing 21 located preferably adjacent the welding head A. On the last means D, it will be appreciated that the welding head A can be used either with or without a flux hopper as desired, although it is preferred that some means for supplying flux to the workpiece 11 and during the course of the welding operation be provided. One such means which has proven extremely suitable is described in the copending patent application of Harold S. Payne and George G. Landis, Serial No. 319,906 filed November 12, 1952.

It will be appreciated also that the conduit C and the flexible drive cables connecting the electrode drive means D may either be allowed to extend across the floor from the base 16 to the place where the welding will be effected, or they may extend in an overhead fashion as desired. One preferred way of carrying the conduits from the base 16 to the welding head A is shown in the copending application of Harold S. Payne and George G. Landis, Serial No. 319,907 filed November 12, 1952, wherein a flexible mast mounted on the base unit extends upwardly and horizontally from the base unit to carry the flexible means from the base unit to the welding head and to support the welding head during the welding operation.

The arc is struck by either advancing the electrode out of the welding head until it engages the workpiece or it is struck by touching the end of the exposed electrode to the workpiece, after which the electrode is continuously fed out of the welding head by operation of the electrode feed motor until the desired welding operation is completed. The welding operation may then be stopped by either reversing the electrode feed motor which thereby immediately reverses the direction of feed of all of the electrode drive means and, thus, pulling the exposed end of the electrode back into the welding head. This lengthens the length of the arc until it is finally extinguished. Alternatively, the welding head may be pulled away from the workpiece 11 to extinguish the arc. An even and uniform speed of feed of the electrode from the nozzle results, regardless of the speed of advancement of the electrode wire and regardless of the distance between the electrode reel and the welding head. No troubles of any kind from elongation of the flexible conduit result and, at the same time, substantially full flexibility of the cable results, thus permitting a full and free movement of the welding head relative to the workpiece.

In accordance with the patent laws, a preferred embodiment of the invention has been described for the purposes of illustrating the invention. It will be appreciated that modifications and alterations of the preferred embodiment described will occur to others skilled in the art upon a reading and understanding of this specification. It is our intention to include all such modifications and alterations insofar as they come within the scope of the appended claims.

Having thus described our invention, we claim:

1. Arc-welding apparatus of the type described comprising, in combination, a welding head from which an electrode of indeterminate length is adapted to be continuously fed toward a workpiece, an electrode source remote from said welding head and means for feeding and guiding the electrode from the source to said head comprising, in combination, a flexible conduit through which the electrode is adapted to be fed from the source to the head, electrode drive means adjacent said source for advancing the electrode into said conduit, electrode drive means adjacent said welding head for pulling the electrode from the conduit and a single power means connected to each drive means for actuating same simultaneously.

2. Arc-welding apparatus of the type described comprising, in combination, a welding head from which an electrode of indeterminate length is adapted to be continuously fed toward a workpiece, an electrode source remote from said welding head and means for feeding and guiding the electrode from the source to said head comprising, in combination, a flexible conduit through which the electrode is adapted to be fed from the source to the head, electrode drive means adjacent said source for advancing the electrode into said conduit, electrode drive means at or adjacent the welding head for pulling the electrode from the conduit and advancing it out of the welding head toward the workpiece, flexible power-transmission means interconnecting said electrode drive means and a single power means for actuating said drive means whereby said electrode is simultaneously pushed into and pulled from the flexible conduit.

3. Arc-welding apparatus of the type described comprising, in combination, a welding head from which an electrode of indeterminate length is adapted to be continuously fed toward a workpiece, an electrode source remote from said welding head and means for feeding and guiding the electrode from the source to said head comprising, in combination, a flexible conduit through which the electrode is adapted to be fed from the source to the head, a plurality of electrode drive means between said source and the exit end of said welding head for pulling and pushing said electrode from the source to the discharge end of the welding head, flexible power-transmitting means interconnecting all of said drive means in series and flexible conduits interconnecting adjacent drive means for guiding the electrode from one drive means to the other.

4. Arc-welding apparatus of the type described comprising, in combination, a welding head from which an electrode of indeterminate length is adapted to be continuously fed toward a workpiece, an electrode source remote from said welding head and means for feeding and guiding the electrode from the source to said head comprising, in combination, a flexible conduit through which the electrode is adapted to be fed from the source to the head, a plurality of electrode drive means for pushing and pulling the electrode from said source to the discharge end of said welding head, said drive means being located at spaced points between said source and the welding head, flexible power means connecting each of said drive means with their adjacent drive means and power means for energizing all of said drive means, flexible conduits interconnecting each adjacent drive means for guiding the electrode from one drive means to the next.

5. The combination of claim 4 wherein the electrode drive means from the electrode source to the welding head are progressively arranged to drive the electrode fastener whereby the electrode wire in the conduit is always under tension.

6. A flexible conduit for guiding an electric arc welding electrode of indeterminate length from an electrode source towards a welding head, comprising: a long helix of wire defining an interior passage through which an electrode is adapted to pass and with the sides of adjacent turns of the wire in abutting relationship when the axis of the helix is straight, a single wire extending generally parallel to the axis of said helix and fixed to both ends of the helix and flexible means holding said wire in side engagement with the outer surface of said helix.

7. A flexible conduit of the type adapted to guide an arc welding electrode from an electrode source to a welding head comprising: a long helix of wire defining an interior passage through which the electrode is adapted to be passed and with the sides of adjacent turns of the wire in abutting relationship when the axis of the helix is straight, a single pair of wires extending parallel to the axis of said helix on diametrically opposite sides thereof and fixed to the ends of said helix and flexible means holding said pair of wires in engagement with the sides of said helix.

8. A flexible conduit of the type adapted to guide an arc welding electrode from a source to a welding head comprising, in combination: a long helix of wire defining an interior passage through which the electrode is adapted to be moved and with the sides of adjacent turns of the wire in abutting relationship when the axis of the helix is straight, whereby the helix has a minimum fully collapsed length and is extendable beyond such length and bendable about its axis, not more than two wires extending generally parallel to said axis for the full length of said helix and fixed to both ends thereof, said wire having a length such as to hold the adjacent turns of the wire in abutting relationship when the axis of the helix is straight, and flexible means holding said wire or wires in engagement with the outer surface of said helix.

9. The combination of claim 6 wherein said wire has a pitch about the axis of said helix of not less than one turn in three feet.

(References on following page)

References Cited in the file of this patent

UNITED STATES PATENTS

| | | |
|---|---|---|
| 471,266 | Buscher | Mar. 22, 1892 |
| 840,536 | Weir | Jan. 8, 1907 |
| 1,524,557 | Kenyon | Jan. 27, 1925 |
| 1,927,896 | Meller | Sept. 26, 1933 |
| 1,953,915 | Burgett et al. | Apr. 3, 1934 |
| 2,444,834 | Landis et al. | July 6, 1948 |
| 2,606,267 | McElrath | Aug. 5, 1952 |
| 2,619,125 | Eickmeyer et al. | Nov. 25, 1952 |
| 2,640,502 | Powers | June 2, 1953 |

FOREIGN PATENTS

| | | |
|---|---|---|
| 447,816 | Great Britain | May 26, 1936 |
| 626,836 | Great Britain | July 21, 1949 |